Jan. 15, 1957  E. POPE  2,777,243
FISH LURES OR SPOONS
Filed Feb. 9, 1953
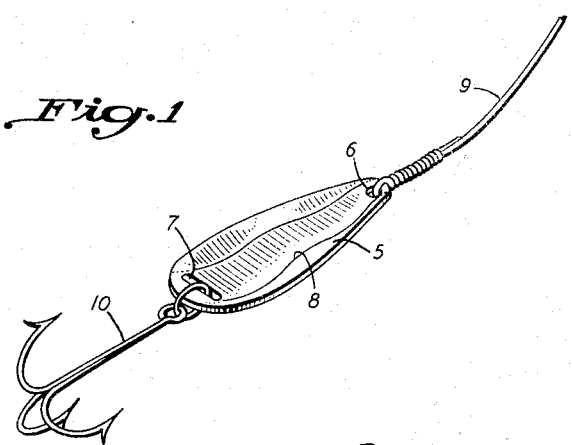
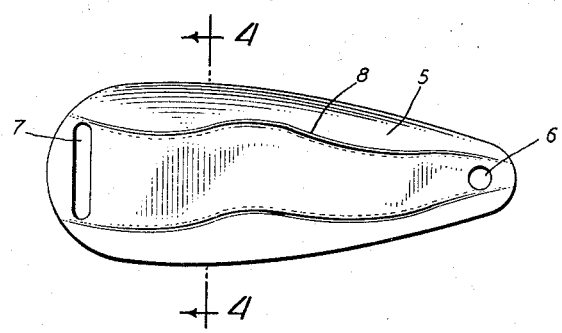
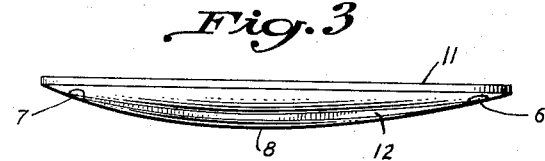
INVENTOR.
EDDIE POPE.
Attorney.

United States Patent Office 2,777,243
Patented Jan. 15, 1957

2,777,243

FISH LURES OR SPOONS

Eddie Pope, Altadena, Calif.

Application February 9, 1953, Serial No. 335,763

1 Claim. (Cl. 43—42.5)

This invention relates to fish dures or spoons, and it has as its principal object to provide a new and improved feature on a fish lure or spoon which will increase its action in the water, that is, will cause it to move with a zig-zag or serpentine action as it is drawn through the water.

In order to more specifically illustrate and describe my invention, I have shown on the accompanying sheet of drawing one practical embodiment of the invention, in which:

Figure 1 is a perspective view showing the invention having attached thereto the line used in fishing, and also a hook at the other end thereof;

Figure 2 is a plan view of a fish lure enlarged;

Figure 3 is an edge view thereof; and

Figure 4 is a cross sectional view, taken on the line 4—4, on Fig. 2.

Referring now in detail to the drawings, my improved fish lure or spoon is stamped out of flat metal in the usual manner, and includes a body 5, having a line attaching hole 6 in its small end, and a slot 7 across its larger end for the attachment of the hook 10. This general arrangement is recognized to be old.

The body of the lure is stamped from sheet metal and is provided in its middle, longitudinal area with what I will refer to as a keel-like ridge on its under side, designated 8, and which is of serpentine or undulating form, as indicated, to cause the lure to move with a zig-zag or serpentine movement through the water and thus, by reason of this irregular and enticing action, attract the fish to it and cause it to strike. The lure as shown on the drawing is about twice the size of the lure used, but can be of any size.

The new keel-like feature can be made narrower and its serpentine or undulating form can be pronounced, but as seen in Fig. 4, the impressed keel portion 8 is sufficient to cause the desired zig-zag movement through the water as the lure is pulled.

The concavo-convex lure is oval-shaped in plan view and has a coplanar upper edge 11. The leading end to which line 9 is connected is narrower than the trailing end. The keel or ridge 8, as seen in Fig. 2, is of gradually decreasing width from the tail end toward the leading end, and the channel forming the keel has its sides 12 extending normal to the plane of the upper edge 11 of the spoon.

I do not limit the invention to the showing which is for explanatory purposes, except as I may be limited by the hereto appended claim.

I claim:

A fish lure, consisting of a substantially oval spoon of concavo-convex form having a coplanar upper edge, said spoon having a relatively narrow leading end and a wider tail end, said spoon also having a keel-like ridge projecting downwardly from its lower convex surface, lengthwise of the spoon and of serpentine shape, said ridge being of gradually decreasing width from said tail end toward said leading end, said ridge being of channel cross-sectional shape, and the sides of the channel extending normal to the plane of the upper edge of the spoon.

References Cited in the file of this patent

UNITED STATES PATENTS

| | | |
|---|---|---|
| 1,306,719 | Robertson | June 17, 1919 |
| 1,450,546 | Hansen | Apr. 3, 1923 |
| 1,770,003 | Miller | July 8, 1930 |
| 1,803,056 | Davis | Apr. 28, 1931 |
| 2,264,211 | La Chance | Nov. 25, 1941 |
| 2,519,048 | Janisch | Aug. 15, 1950 |
| 2,527,064 | Hufnagel | Oct. 24, 1950 |
| 2,554,216 | Scott | May 22, 1951 |